US012573911B2

(12) United States Patent (10) Patent No.: US 12,573,911 B2
Sawarkar et al. (45) Date of Patent: Mar. 10, 2026

(54) STATOR FOR AN ELECTRICAL REFRIGERANT DRIVE AND ELECTRICAL REFRIGERANT DRIVE FOR A MOTOR VEHICLE

(71) Applicant: Brose Fahrzeugteile SE & Co. Kommanditgesellschaft, Würzburg, Würzburg (DE)

(72) Inventors: Kartik Sawarkar, Wakad (IN); Stefan Portner, Randersacker (DE); Stefan Wüst, Lohr am Main (DE); Alexander Volkamer, Oberscheinfeld (DE)

(73) Assignee: Brose Fahrzeugteile SE & Co. Kommanditgesellschaft, Würzburg, Würzburg (DE)

( * ) Notice: Subject to any disclaimer, the term of this patent is extended or adjusted under 35 U.S.C. 154(b) by 218 days.

(21) Appl. No.: 18/494,939

(22) Filed: Oct. 26, 2023

(65) Prior Publication Data

US 2024/0072596 A1 Feb. 29, 2024

Related U.S. Application Data

(63) Continuation of application No. PCT/EP2022/060855, filed on Apr. 25, 2022.

(30) Foreign Application Priority Data

Apr. 26, 2021 (DE) .................... 10 2021 204 133.7

(51) Int. Cl.
H02K 3/50 (2006.01)
H02K 3/52 (2006.01)
(Continued)

(52) U.S. Cl.
CPC .............. H02K 5/225 (2013.01); H02K 3/50 (2013.01); H02K 3/52 (2013.01); H02K 1/16 (2013.01)

(58) Field of Classification Search
CPC ............ H02K 3/50; H02K 3/52; H02K 5/225; H02K 5/10; H02K 1/16; H02K 5/08
(Continued)

(56) References Cited

U.S. PATENT DOCUMENTS 8,013,705 B2 9/2011 Oh et al.
2002/0155741 A1 10/2002 Herrick et al.
(Continued)

FOREIGN PATENT DOCUMENTS

CN 112436661 A 3/2021
CN 216216106 U 4/2022
(Continued)

OTHER PUBLICATIONS

Podack Marcus, Electric Refrigerant Drive, May 30, 2018, DE 102016223576 (English Machine Translation) (Year: 2018).*
(Continued)

*Primary Examiner* — Alexander A Singh
(74) *Attorney, Agent, or Firm* — Laurence A. Greenberg; Werner H. Stemer; Ralph E. Locher

(57) ABSTRACT

A stator for an electrical refrigerant drive includes a laminated core wound with a stator winding, and a contact adapter mounted on the laminated core for connecting the stator winding to at least one phase connector. The contact adapter has at least one potting pocket and the phase connector is fitted in the potting pocket. A winding portion of the stator winding is guided into the potting pocket and contacted with the phase connector. The potting pocket is filled with a cured potting material. A motor vehicle electrical refrigerant drive having the stator is also provided.

7 Claims, 9 Drawing Sheets

(51) Int. Cl.
　　H02K 5/22　　　　　(2006.01)
　　H02K 1/16　　　　　(2006.01)
(58) Field of Classification Search
　　USPC ........................................................... 310/71
　　See application file for complete search history.

(56)　　　　　　　References Cited

U.S. PATENT DOCUMENTS

| | | | |
|---|---|---|---|
| 2009/0278640 A1 | 11/2009 | Oh et al. | |
| 2015/0145360 A1* | 5/2015 | Okada ...................... | H02K 3/50 |
| | | | 310/71 |
| 2022/0190669 A1 | 6/2022 | Podack et al. | |

FOREIGN PATENT DOCUMENTS

| | | | | |
|---|---|---|---|---|
| DE | 102011112820 A1 | 3/2013 | | |
| DE | 102013020094 B4 | 6/2015 | | |
| DE | 102016223576 A1 * | 5/2018 | ............. | H02K 11/33 |
| DE | 102017216807 A1 | 3/2019 | | |
| DE | 102019207942 A1 | 12/2020 | | |
| DE | 102019217540 A1 | 3/2021 | | |
| EP | 1622241 B1 | 2/2007 | | |
| EP | 2178193 A1 | 4/2010 | | |
| JP | S61218338 A | 9/1986 | | |
| JP | H07222388 A | 8/1995 | | |
| JP | 2010075010 A | 4/2010 | | |
| JP | 4682999 B2 | 5/2011 | | |
| JP | 5099715 B2 | 12/2012 | | |
| JP | 2013222586 A * | 10/2013 | | |
| JP | 6286617 B2 | 2/2018 | | |
| WO | 2017107538 A1 | 6/2017 | | |

OTHER PUBLICATIONS

Ozaki et al., Method of Manufacturing the Stator of the Motor, Oct. 28, 2013, JP 2013222586 (English Machine Translation) (Year: 2013).*

* cited by examiner

STATOR FOR AN ELECTRICAL REFRIGERANT DRIVE AND ELECTRICAL REFRIGERANT DRIVE FOR A MOTOR VEHICLE

CROSS-REFERENCE TO RELATED APPLICATION

This application is a continuation, under 35 U.S.C. § 120, of copending International Patent Application PCT/EP2022/060855, filed Apr. 25, 2022, which designated the United States; this application also claims the priority, under 35 U.S.C. § 119, of German Patent Application DE 10 2021 204 133.7, filed Apr. 26, 2021; the prior applications are herewith incorporated by reference in their entirety.

FIELD AND BACKGROUND OF THE INVENTION

The invention relates to a stator for an electrical refrigerant drive having a stator core which is wound with a stator winding, and having a contact adapter, which is attached to the stator core, for connecting the stator winding to at least one phase connector. The invention furthermore relates to an electrical refrigerant drive having such a stator.

Air conditioning units which control the climate of the vehicle cabin with the aid of a system forming a refrigerant circuit are typically installed in motor vehicles. Systems of that type fundamentally have a circuit in which a refrigerant is guided. The refrigerant, for example R-134a (1,1,1,2-tetrafluoroethane) or R-744 (carbon dioxide), is heated on an evaporator and compressed by a (refrigerant) compressor or air conditioning compressor, whereby the refrigerant subsequently again discharges the absorbed heat via a heat exchanger, before the refrigerant is once again guided to the evaporator via a throttle.

In applications of that type, scroll machines are fundamentally possible as compressors for the refrigerant, for example. Scroll compressors of that type typically have two scroll parts which are movable relative to one another and during operation function as a type of displacement pump. The two scroll parts therein are typically embodied as a pair of mutually nested helical spirals or scrolls. In other words, one of the spirals engages at least partially in the other spiral. The first (scroll) spiral therein is fixed in relation to a compressor housing (stationary scroll; fixed scroll), whereby the second (scroll) spiral is driven in an orbit within the first spiral by an electric motor (movable scroll; orbiting scroll).

A brushless electric motor is typically provided for an electric or electromotive drive of a compressor head having the scroll machine. An, in particular, brushless electric motor as an electric (three-phase) machine usually has a stator which is provided with a multi-phase field or stator winding and is disposed coaxially with a rotor having one or a plurality of permanent magnets. The rotor as well as the stator are constructed as laminated cores, for example, whereby stator teeth protrude into intervening stator grooves that support the coils of the stator winding.

In a brushless electric motor, the alternating current provided for supplying the stator winding is usually generated by a converter (inverter) of a motor electronics unit or of a motor control unit. To that end, the stator winding is guided to the converter, or connected thereto, by way of phase connectors. The motor electronics unit is typically received in an electronics housing for protection against environmental influences (contamination, moisture). The electronics housing is expediently disposed therein in the proximity of a motor housing which receives the electric motor.

A comparatively high output of the electric motor is required for a rapid and reliable start-up and operation of the compressor. In other words, comparatively high (three-phase) currents are required for driving the rotor in order for the compressor to be able to be accelerated to an operating speed in a short time. Significant heat is produced when the stator winding is applied with a high current. For cooling, the electric motor, or the stator, has a flow of refrigerant and/or a motor fluid (motor oil) surrounding it during operation.

That necessitates a fluid-tight and pressure-tight separation between the motor housing and the electronics housing so that the power electronics of the motor electronics unit do not suffer damage or destruction. For that purpose, the phase connectors are sealed in relation to the housings by a through connection, for example. Such a through connection is described in German Patent Application DE 10 2016 223 576 A1, for example.

In high-voltage applications it is furthermore necessary that all open conductors in the region of the motor are isolated. For example, the stator winding is applied to the stator core in the form of a plurality of individual coils which are welded to a contact or terminal unit including the phase connectors. Comparatively complex contacting of the stator winding is implemented as a result, whereby the welded regions are typically not uniformly embodied, which impedes the isolation in the region of the motor.

SUMMARY OF THE INVENTION

It is accordingly an object of the invention to provide a stator which is particularly suitable for an electrical refrigerant drive and an electrical refrigerant drive for a motor vehicle, which overcome the hereinafore-mentioned disadvantages of the heretofore-known devices of this general type and with which a simple and reliable electrical isolation of electric conductors is to be implemented in particular.

With the foregoing and other objects in view there is provided, in accordance with the invention, a stator for an electrical refrigerant drive, the stator having:

a stator core which is wound with a stator winding; and a contact adapter, which is attached to the stator core, for connecting the stator winding to at least one phase connector;

the contact adapter has at least one potting pocket;

the phase connector is inserted into the potting pocket;

a winding portion of the stator winding is guided into the potting pocket and contacts the phase connector; and the potting pocket is filled with a cured potting material.

With the objects of the invention in view, there is concomitantly provided an electrical refrigerant drive for a motor vehicle, having a stator according to the invention.

Advantageous structural embodiments and refinements are the subject matter of the dependent claims. The advantages and structural embodiments set forth in terms of the stator can also be applied in an analogous manner to the refrigerant drive and vice versa.

The stator according to the invention is provided for an electrical refrigerant drive, and also suitable and specified for this purpose. This by referring to that the stator is provided and specified to be surrounded by a flow of a refrigerant and/or a motor fluid (motor oil) during operation. The refrigerant drive herein is preferably an air conditioning compressor of a motor vehicle.

The stator has a stator core as the stator body to which a stator winding is applied. The stator core is embodied, for example, as a laminated core having an encircling stator yoke and having a number of radially oriented stator teeth. The stator winding is embodied as a multi-phase rotating field winding which is wound about the stator teeth. The stator winding is preferably embodied as an end-to-end, or continuous, (wire) winding. The stator winding is in particular applied to the stator core as a continuous needle winding.

The stator furthermore has a contact adapter (connection cover), which is attached to the stator core at the end-side, for connecting the stator winding to at least one phase connector. In the case of a multi-phase stator winding, one phase connector is preferably provided for each (stator) phase. In other words, the stator has a number of phase connectors corresponding to the number of phases. A stator winding which is embodied as a continuous needle winding herein preferably has three phase connectors, thus guaranteeing a particularly minor complexity in terms of connections.

The electrical isolation of the connection points or contact points between the stator winding and the phase connectors takes place according to the invention by potting.

For this purpose, the contact adapter, which is embodied, for example, as an injection-molded part, has at least one potting pocket into which the phase connector is inserted. A potting pocket herein is understood to be in particular a, for example, pot-shaped, socket-shaped or cup-shaped receptacle for a potting material or a potting compound. The contact adapter has in particular a number of potting pockets corresponding to the number of phase connectors, a respective assigned phase connector being inserted into each potting pocket. At least one winding portion of the stator winding herein is guided into the potting pocket and electrically contacts the phase connector; for example, two winding portions which are disposed so as to be stacked on top of one another are in contact with the phase connector. For the purpose of providing protection against ingress, the potting pocket is filled with a cured potting material or a potting compound, for example an epoxy resin. A particularly suitable stator is implemented as a result.

It is thus provided according to the invention that the stator, or its contact adapter, has a contour or receptacle for potting, the connection point or the contact point between the stator winding and the phase connector being embedded therein. A reliable and simple as well as cost-effective electrical isolation in relation to the refrigerant and/or motor fluid is implemented as a result.

The potting material herein is expediently filled into the potting pocket after the winding portion and the phase connector have been contacted or connected. As a result, the winding portion and the phase connector are enclosed and thus electrically isolated by the cured potting compound. Furthermore, the cured potting compound implements mechanical stabilizing, the tension relief of the phase connector being improved as a result. For example, a material with good adhesive properties and high chemical resistance to refrigerants and/or a motor fluid is used as the potting material, such as epoxy resin, for example.

In one advantageous embodiment, the potting pocket is formed by a projecting periphery which is closed in an encircling manner and is molded in one piece, thus integrally or monolithically, on the contact adapter. A simple and expedient potting pocket is formed as a result.

In a suitable refinement, the potting pocket has an integrally molded guide contour for guiding the winding portion. This simplifies assembling and contacting of the stator. The potting pocket herein preferably has a wire-guiding groove and/or a wire-guiding ramp as a guide contour. The wire-guiding groove is integrally molded, for example, on the periphery of the potting pocket, the wire-guiding ramp being configured, for example, as a guide from the periphery to the contact point. The conjunction "and/or" presently and hereunder is to be understood in such a manner that the features linked by this conjunction may be configured conjointly and also as mutual alternatives.

In one conceivable structural embodiment, the potting pocket has integrally molded positioning elements for positioning and/or mounting the phase connector. The assembling of the stator is further simplified as a result. The positioning elements herein are configured, for example, as webs or appendages that protrude into the opening of the potting pocket.

An additional or further aspect of the invention provides that the phase connector has a phase pin as a connector pin (phase extension, phase connector contact) and a conductor path, thus contacted, for contacting the winding portion, as well as a phase dome as a housing. As a result, the phase connector is embodied as a prefabricated module which is able to be assembled in the potting pocket substantially independently of the winding portion. In other words, the phase connector is pre-assembled and provided. The phase connector is subsequently assembled in the potting pocket. Due to the degree of prefabrication implementable as a result, the production of the stator is simplified and costs are reduced in this way.

The phase pin herein forms the stator-proximal interface to a motor electronics unit, or to a converter, respectively. The conductor path is embodied, for example, as a stamped grid which electrically contacts the phase pin.

For example, the phase pin and the conductor path are connected to one another in a materially integral manner, in particular welded. A "substance-to-substance bond" or a "materially integral connection" between at least two parts connected to one another is presently and hereunder understood to mean in particular that the parts connected to one another are held together at their contact faces by bonded or cross-linked material (for example, by virtue of atomic or molecular bonding forces), optionally in interaction with an additive.

In the assembled state, the phase dome herein is preferably completely embedded in the potting material with only the phase pin projecting beyond the potting material.

For the fluid-tight and pressure-tight sealing of the phase pin in relation to a housing or a housing wall, the phase connector preferably has a through connection. The through connection herein has, for example, a multi-part construction having a first sleeve and having a sealing element, and also having a second sleeve. The first sleeve is attached to the phase pin and joined to the phase dome preferably in a materially integral manner, in particular by ultrasonic welding. The sealing element, for example in the form of an annular seal or O-ring, is attached to the first sleeve, the second sleeve being attached to the sealing element and the first sleeve. The sleeves in the process form an insulation sleeve which encases or encloses the phase connector at least in portions, the sealing element being configured as a radially projecting sealing collar. The sleeves herein are produced from a polyamide plastics material (PA), for example.

In an expedient structural embodiment, the conductor path has a U-shaped contact region for contacting the winding portion. The winding portion herein sits between the U-legs, the winding portion for contacting being in particular contacted by way of the two vertical U-legs. Simple and reliable contacting of the winding portion is implemented as a result.

The U-shaped contact region herein can be oriented so as to be open toward the top or bottom. "Open toward the bottom" herein by referring to in particular that the opening between the U-legs is oriented in the direction of a base of the potting pocket. In an analogous manner, "open toward the top" by referring to in particular that the opening between the U-legs is oriented toward a (filling) opening of the potting pocket, thus away from the base.

Whether the contact region herein is embodied so as to be open toward the top or bottom depends substantially on the assembly concept or the assembly sequence of the stator. In the case of a contact region open toward the top, the phase connector is preferably first assembled in the potting pocket, and the winding portion is subsequently pressed or guided into the contact region. In contrast to this, in the case of a contact region open toward the bottom, the winding portion is first positioned in the potting pocket, and the phase connector, or the contact region, respectively, is subsequently inserted or pressed into the potting pocket.

In an advantageous refinement, the phase dome is embodied as an overmolding or encapsulation of the phase pin and the conductor path. The phase dome herein preferably has integrally molded mating contours for the positioning elements of the potting pocket. In the assembled state, the mating contours and positioning elements herein engage preferably in a form-locking manner in one another. Reliable mounting and positioning of the phase connector in the potting pocket is guaranteed as a result.

A "form-lock" or a "form-locking connection" between at least two parts connected to one another is presently and hereunder understood to mean in particular that the cohesion of the parts connected to one another in at least one direction is established by way of a direct mutual engagement of contours of the parts per se, or by way of an indirect mutual engagement via an additional connecting part. The "blocking" of any mutual movement in this direction is thus established due to the shape.

The electrical refrigerant drive according to the invention is provided as well as suitable and specified for a motor vehicle. The refrigerant drive herein is configured, for example, as an air conditioning compressor of a vehicle air conditioning system. The refrigerant drive herein has, for example, a scroll compressor driven by an electric motor, the in particular brushless electric motor having a stator as described above.

Other features which are considered as characteristic for the invention are set forth in the appended claims.

Although the invention is illustrated and described herein as embodied in a stator for an electrical refrigerant drive and an electrical refrigerant drive for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
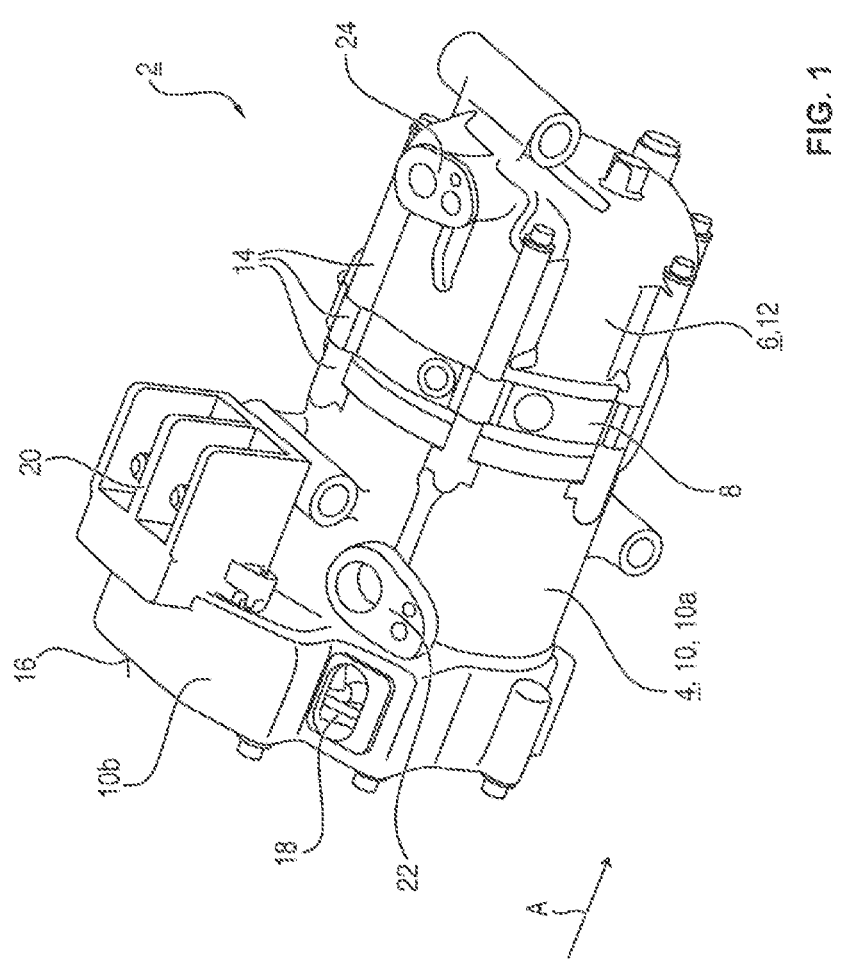
FIG. 1 is a diagrammatic, perspective view of an electrical refrigerant drive.

Referring now in detail to the figures of the drawings, in which equivalent parts and variables are always provided with the same reference signs, and first, particularly, to FIG. 1 thereof, there is seen a refrigerant drive 2 according to the invention, which is installed, for example, in a refrigerant circuit of an air conditioning system of a motor vehicle, which is not illustrated in more detail. The refrigerant drive 2, driven by an electric motor, has an electric (electromotive) drive 4 and a scroll compressor 6 coupled thereto as a compressor head. A center plate 8 is provided as a mechanical interface between the drive 4 and the scroll compressor 6. The scroll compressor 6 for driving is operatively connected to the drive 4 by the center plate 8.

The center plate 8 forms an intermediate wall between a drive housing 10 and a compressor housing 12. The scroll compressor 6 is connected (joined, screwed) to the drive 4 by flange connections 14 which are circumferentially distributed and extend in an axial direction A of the refrigerant drive 2 and in the figures are provided with reference signs only by way of example.

A compressor-proximal housing sub-region of the drive housing 10 is configured as a motor housing 10a for receiving an electric motor—not shown in more detail. The motor housing 10a is closed on one side by an integrated housing intermediate wall—not shown—toward an electronics housing 10b provided with a housing cover 16 and having a motor electronics unit (electronics) 18 which actuate(s) the electric motor. The motor housing 10a is closed on the other side by the center plate 8. The drive housing 10 in the region of the electronics housing 10b has a connector portion 20 for electrically contacting the electronics 18 with an onboard wiring of the motor vehicle.

The refrigerant drive 2 has a (refrigerant) inlet or (refrigerant) inflow 22 and a (refrigerant) outlet 24 for connecting to the refrigerant circuit. The inlet 22 is integrally molded in a region of the motor housing that faces the electronics housing 10b. The outlet 24 is integrally molded on a base of the compressor housing 12. In the connected state, the inlet 22 forms the low-pressure side or suction side (suction gas side), and the outlet 24 forms the high-pressure or pump side of the refrigerant drive 2.

In this way, the refrigerant between the inlet 22 and the outlet 24 is guided through the motor housing 10a so that the electric motor is surrounded by a flow of the refrigerant for cooling.

Figure 2:
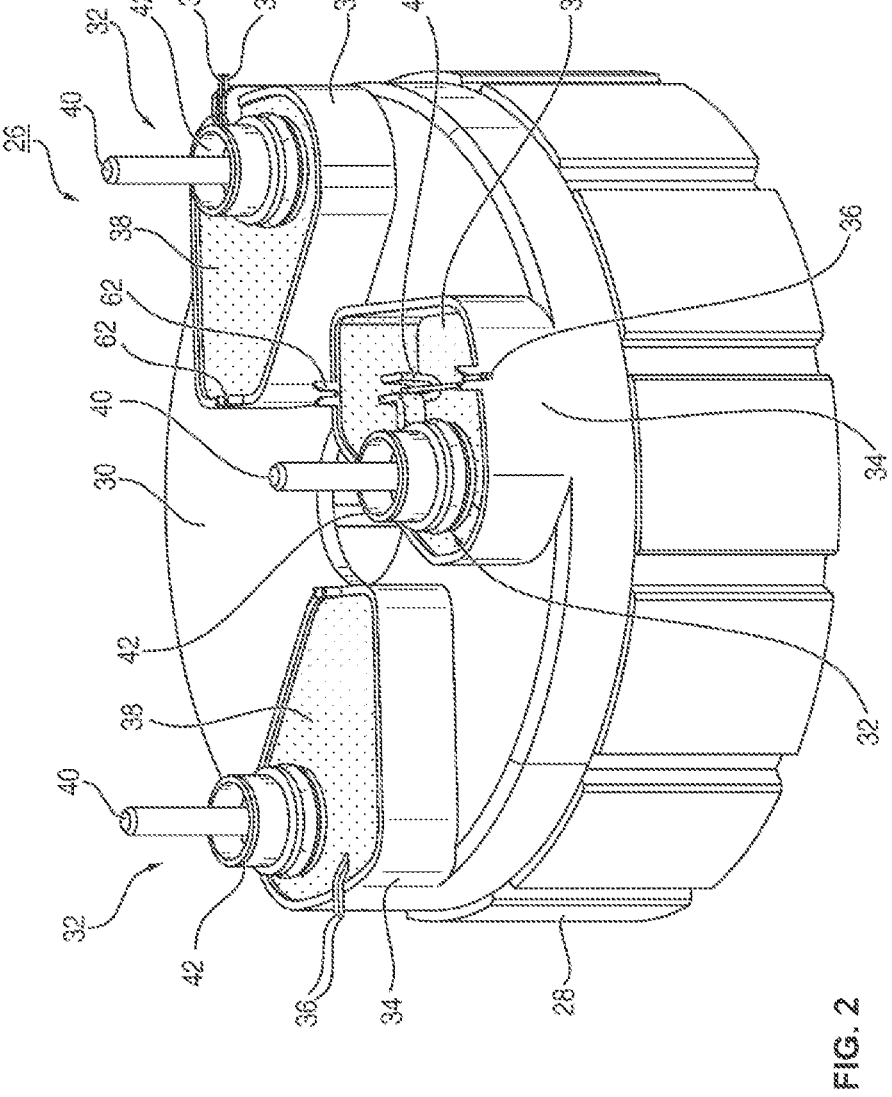
FIG. 2 is a perspective view of a stator of the refrigerant drive, having three phase connectors.

FIG. 2 shows a stator 26 of the electric motor. The stator 26 has a stator core 28 as a stator body, which is embodied, for example, as a laminated core. The stator core 28 herein has an encircling stator yoke having stator teeth which protrude radially inward and to which a stator winding—not illustrated in more detail—is applied. The stator winding herein is applied to the stator core 28 as an end-to-end or continuous needle winding.

The stator 26 furthermore has a contact adapter 30, which is attached to the end side of the stator core 28, for connecting the, in particular, three-phase stator winding to three axially projecting phase connectors 32. The contact adapter 30, which is approximately annular in shape, is preferably an injection-molded part and has a central opening—not referred to in more detail—for a motor shaft. Three integrally molded potting pockets 34 are disposed so as to be distributed about the opening, one of the phase connectors 32 being received in each potting pocket.

For contacting and connecting the stator winding, winding portions 36 of the stator winding are guided into the potting pockets 34 and in the latter electrically contact the phase connectors 32. For this purpose, two winding portions 36, which are disposed so as to be stacked on top of one another, are in each case guided into a respective potting pocket 34, for example. The electrical isolation of the connection points or contact points between the winding portions 36 and the phase connectors 32 takes place by potting that is filled into the potting pockets 34. In other words, the potting pocket 34 is filled with a cured potting material 38 for the purpose of providing protection against ingress. The potting material 38 in the center is illustrated so as to be partially transparent in FIG. 2.

The construction of the phase connectors 32 will first be explained in more detail hereunder by referring to FIG. 3 to FIG. 7. The phase connector 32 is embodied as a prefabricated module which is able to be assembled in the potting pocket 34 substantially independently of the winding portion 36.

The phase connector 32 herein has an axially oriented phase pin 40 as a phase connector contact. The phase pin 40 in the assembled state, by way of its free end, protrudes into the electronics housing 10b, and through the use of a through connection 42 is guided in a pressure-tight and fluid-tight manner through the housing intermediate wall between the motor housing 10a and the electronics housing 10b. The through connection 42 and the phase pin 40 herein, at least in portions, project axially from a surface of the potting material 38.

Figure 3:
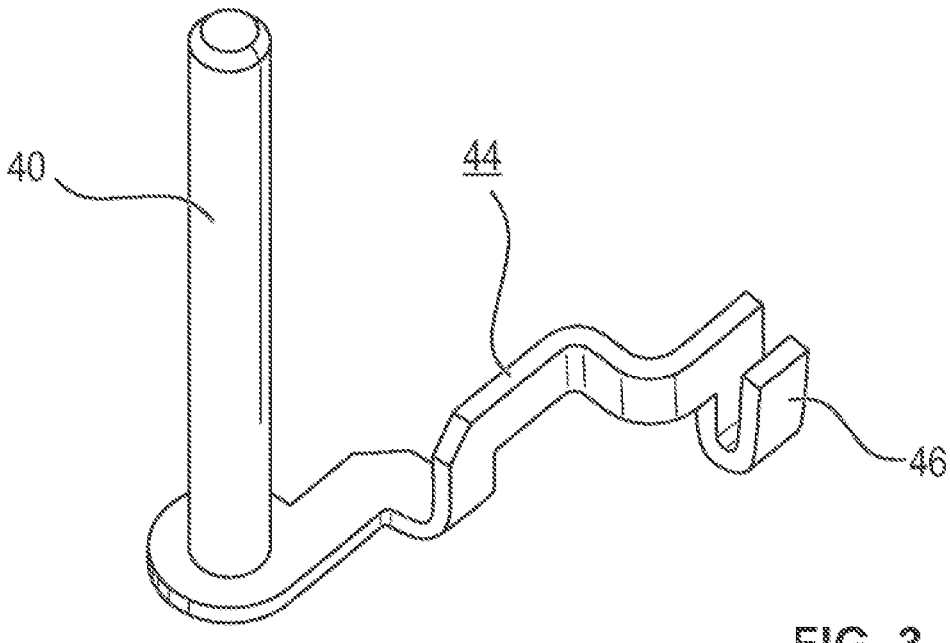
FIG. 3 to FIG. 7 are perspective views showing the construction of a phase contact.
Figure 4:
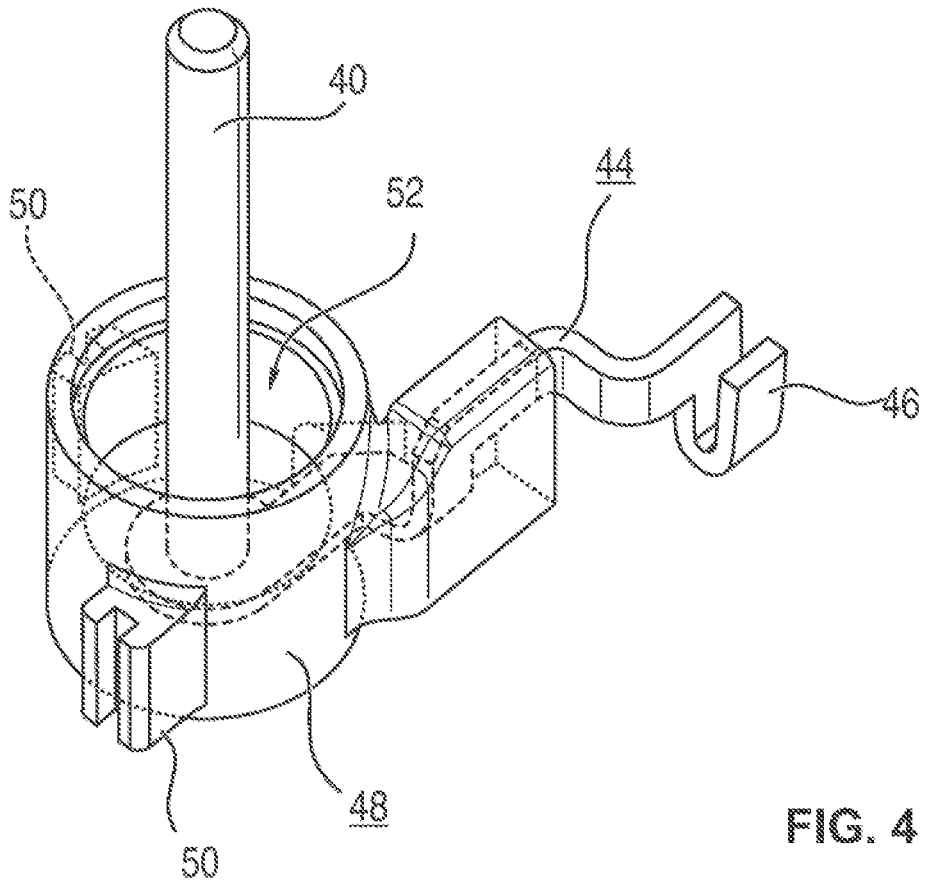

The phase pin 40, at a fixed end, is connected in a materially integral and electrically conducting manner to a conductor path 44. For example, the pin-shaped or cylindrical phase pin 40 is welded to the conductor path 44 which is configured as a stamped grid or flat conductor (FIG. 3).

The conductor path 44 herein is configured in particular as a stamped-and-bent part. The conductor path 44, on a conductor path end opposite the phase pin 40, has a contact region 46 for contacting the winding portions 36. As can be seen comparatively clearly in FIGS. 3 to 7, the contact region 46 has substantially the shape of the capital letter "U." The vertical U-legs herein are oriented along the axial direction A, the contact region 46, or the U-shape, being open toward the top, thus in the direction of the electronics housing 10b.

The phase pin 40 and the conductor path 44 are at least partially embedded in an overmolding or encapsulation. The overmolding herein is embodied as a housing-type phase dome 48 through the use of which the phase connector 32 is assembled in the potting pocket 34. The phase dome 48 is illustrated so as to be partially transparent in FIG. 4. The conductor path 44 between the contact region 46 and the welded connection to the phase pin 40 has a bend as an axial offset so that a base of the phase dome 48 and a lower edge of the contact region 46 are disposed substantially in one plane. As a result, the phase connector 32 is able to be inserted into the potting pocket 34 so as to sit flush in the latter.

The phase dome 48 on its external circumference has two groove-type mating contours 50. The phase dome 48 in the direction of the phase pin 40 has an approximately hollow-cylindrical or tubular structural embodiment having a receptacle 52 which surrounds the phase pin 40. The through connection 42 herein is at least partially disposed in the receptacle 52.

Figure 5:
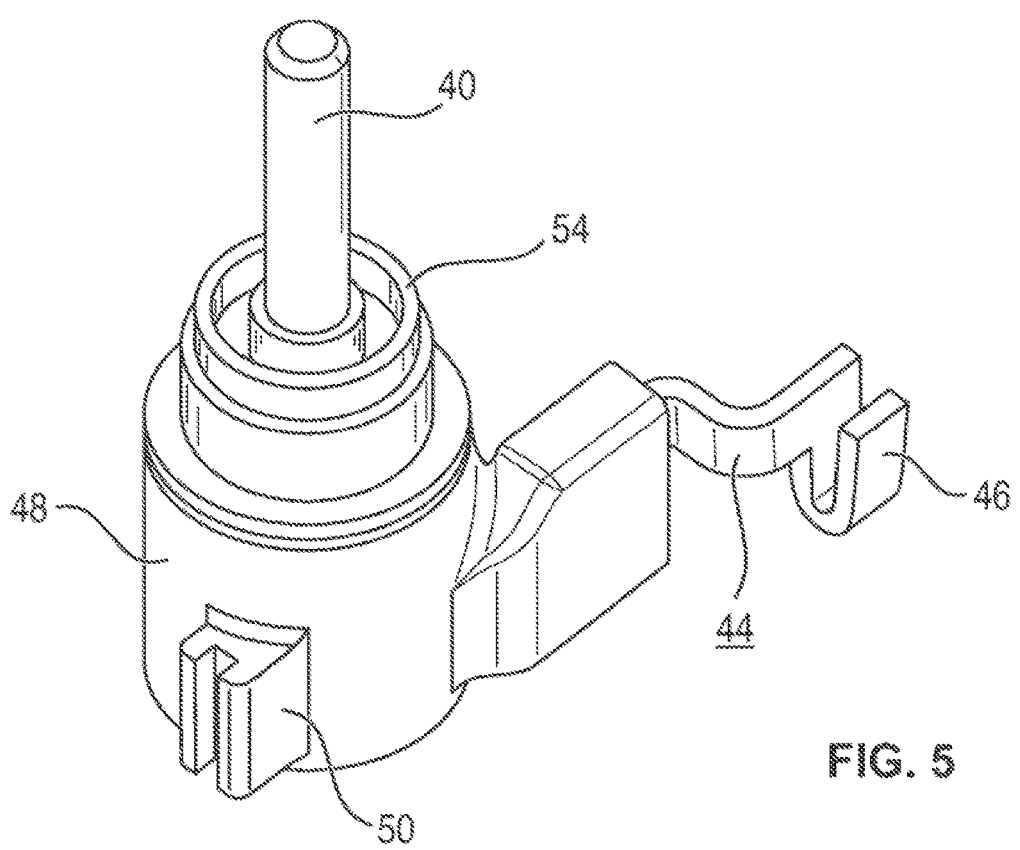
Figure 6:
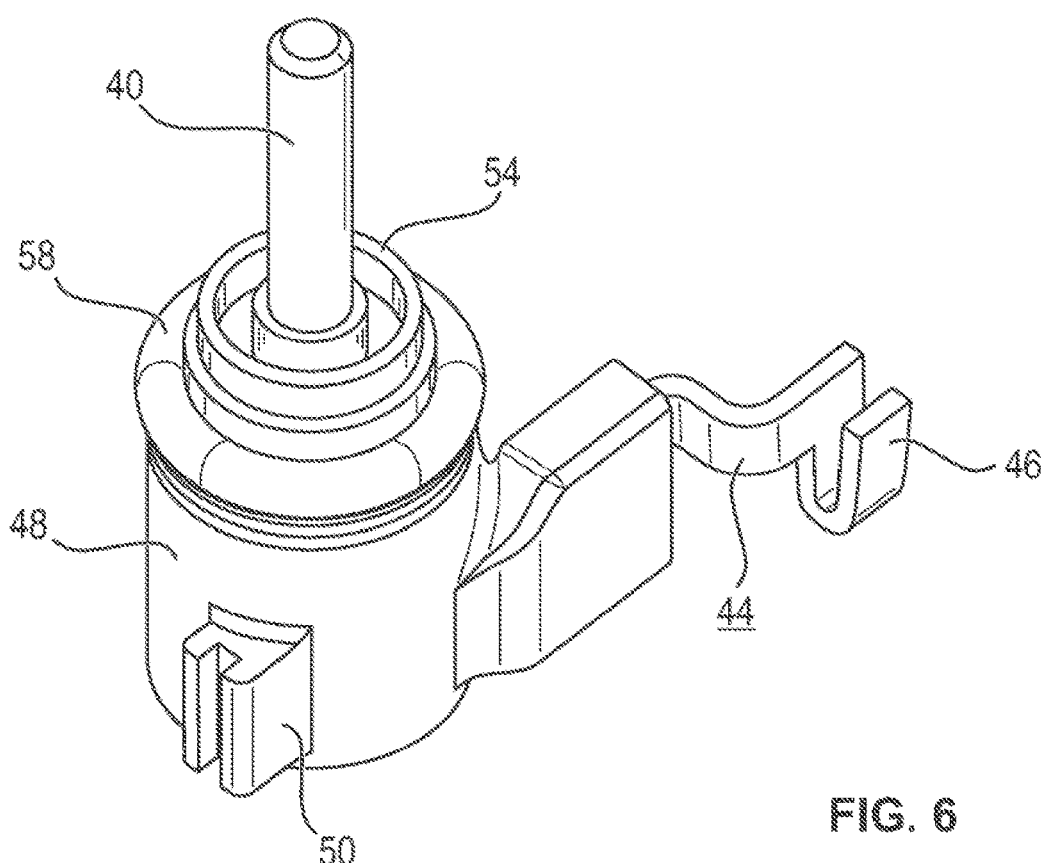
Figure 7:
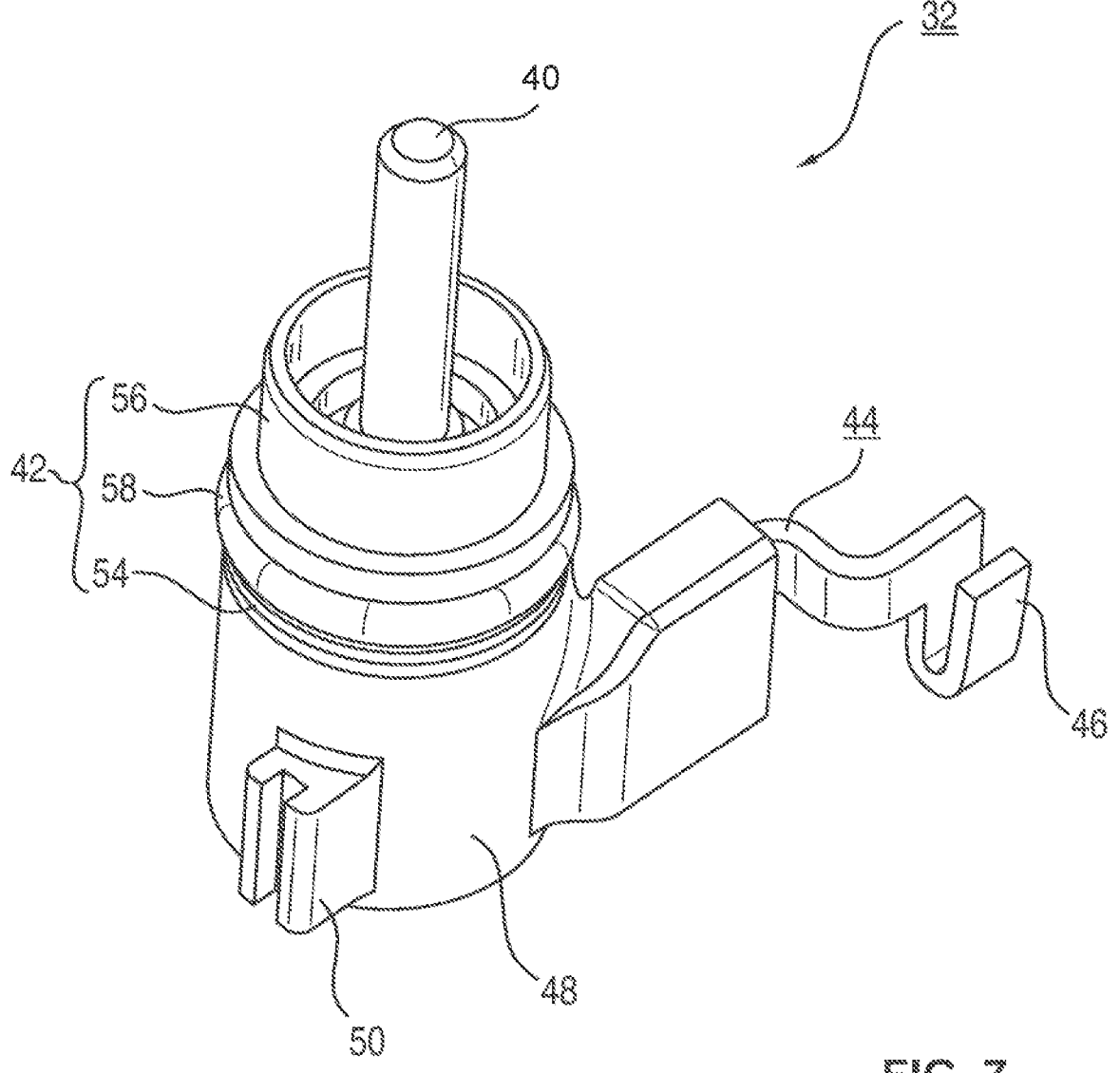

The construction of the through connection 42 will be explained in more detail hereunder by referring to FIGS. 5 to 7. The through connection 42 herein has two joined-together sleeves 54, 56, and a sealing element 58 which is embodied as an O-ring. For assembling the through connection 42, the sleeve 54 is first attached to the phase pin 40 and inserted into the receptacle 52. For sealing in relation to the potting material 38, the sleeve 54 is joined in an encircling and materially integral manner to the phase dome 48. In particular, the sleeve 54 and the phase dome 48 are ultrasonically welded to one another in the process (FIG. 5). Thereafter, the sealing element 58 is placed on the sleeve 54 (FIG. 6). Finally, the sleeve 56 is attached (FIG. 7).

Figure 8:
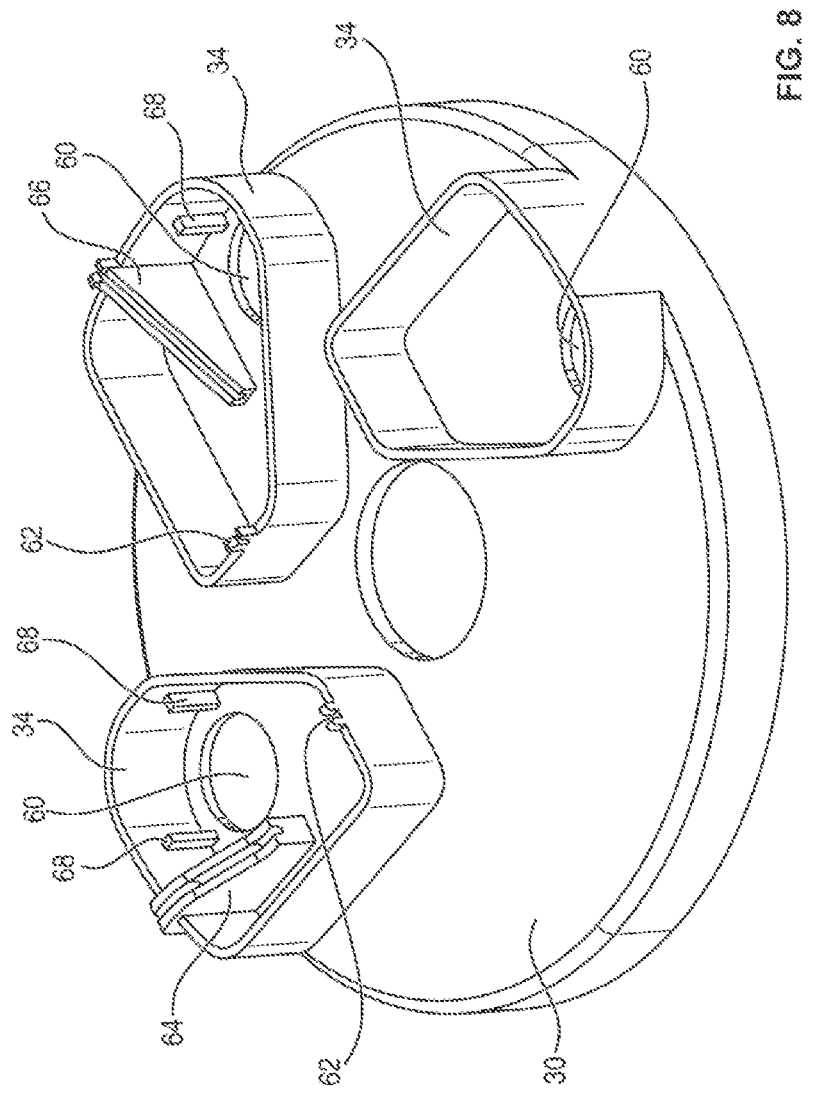
FIG. 8 is a perspective view of a contact adapter of the stator.

The construction of the contact adapter 30, in particular of the potting pockets 34, will be explained in more detail hereunder by referring to FIG. 8 and FIG. 9. FIG. 8 herein by way of example shows an embodiment of the contact adapter 30 having three dissimilar potting pockets 34; however, the potting pockets 34 may also be of identical configurations.

The potting pockets 34 herein are in each case formed by an axially projecting periphery which is closed in an encircling manner and is integrally molded, thus as one piece or monolithically, on the end side of the contact adapter 30. A simple and expedient potting pocket is formed as a result. The potting pockets 34 herein have in each case a predefined volume for receiving the potting material 38. The potting pockets 34, which are pot-shaped, for example, thus have the periphery as the side wall (pocket wall) as well as a (pocket) base which is formed by the end side of the contact adapter 30. A circular depression 60 as a receptacle for the phase connector 32, or the phase dome 48, respectively, is in each case incorporated in the base of the potting pockets 38.

Two of the potting pockets 34 in FIG. 8 have integrally molded guide contours 62, 64, 66 for guiding the winding portions 36 in the potting pockets 34.

The potting pockets 34 herein, radially on the inside, have in each case one wire-guiding groove 62 as the guide contour. The wire-guiding groove 62 has an approximate U-shape or V-shape and is integrally molded so as to project axially on an upper periphery of the rim of the potting pocket 34. The clearance between the legs of the wire-guiding groove 62 is configured to receive and guide the winding portions 36.

The potting pockets 34 furthermore have in each case one guide contour 64, 66 which is configured as a wire-guiding ramp. The wire-guiding ramps 64, 66 are embodied as groove-type wire guides for the winding portions 36, which extend in the manner of a ramp from the upper periphery of the rim of the potting pocket 34 to the base of the potting pocket 34. The wire-guiding ramps 64, 66 herein have an approximately radially oriented alignment, whereby the wire-guiding ramp 66 has a straight profile, and the wire-guiding ramp 64 has an approximately S-shaped, curved profile. The wire-guiding ramp 64 is shown in more detail in the illustration of FIG. 9.

Figures 9, 10:
FIG. 9 is a fragmentary, perspective view of a potting pocket of the contact adapter.
FIG. 10 is a fragmentary, top-plan view of the potting pocket having a phase connector.

As can be seen in particular in the view from above of FIG. 10, the wire-guiding ramps 64, 66 are integrally molded so as to be opposite the respective wire-guiding groove 62 on the potting pocket 34. In other words, the guide contours 62, 64, 66 are disposed on a common line so that the winding portions 36 are able to be guided straight through the potting pocket 34, thus without bends or kinks.

The potting pockets 34 furthermore have two positioning elements 68 which are disposed at a mutual spacing and in the region of the depression 58. The positioning elements 68 as axially running appendages or webs are integrally molded on the internal wall of the potting pockets 34. The positioning elements 68 herein are disposed about the depression 60 and in relation to the internal wall of the potting pocket 34 project approximately radially in the direction of the depression 60.

The positioning elements 68 herein serve for positioning and mounting the respective phase connector 32 in a form-locking manner. As can be seen, in particular, in FIG. 10, in the assembled or joined state, the positioning elements 68 engage in the mating contours 50 of the phase dome 48, which are of a complementary shape, so that the phase dome 48—and thus the phase connector 32—sits in the potting pocket 34 so as to be secured against rotation. The phase dome 48 herein preferably has an approximately cylindrical appendage which sits in a form-locking manner in the depression 60. In this way, the depression 60 likewise acts as a positioning element for positioning and mounting the phase connector 32.

As can likewise be seen in FIG. 10, the conductor path 44 is curved in such a manner that the contact region 46 is disposed so as to be co-aligned in a line with the guide contours 64, 62. In other words, the conductor path 44 has a tangentially and/or radially oriented offset.

Figure 11:
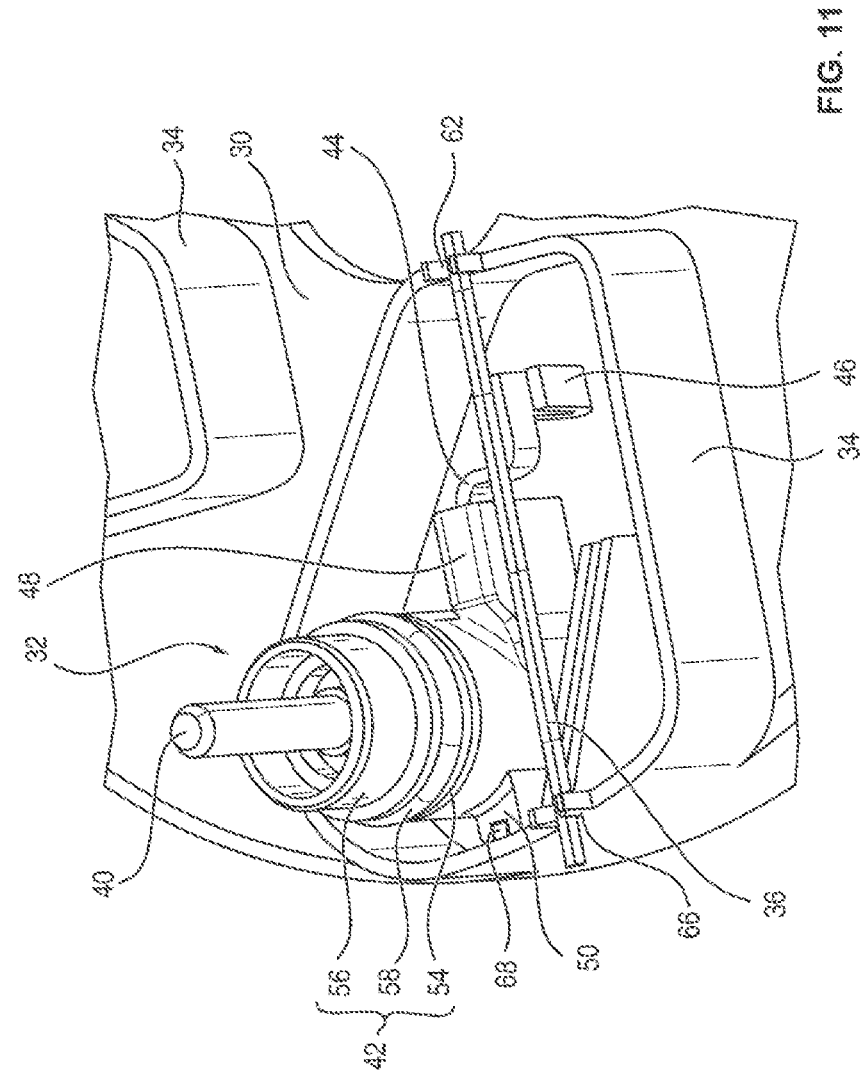
FIG. 11 and FIG. 12 are fragmentary, perspective views of a connection between a winding portion and the phase connector.
Figure 12:
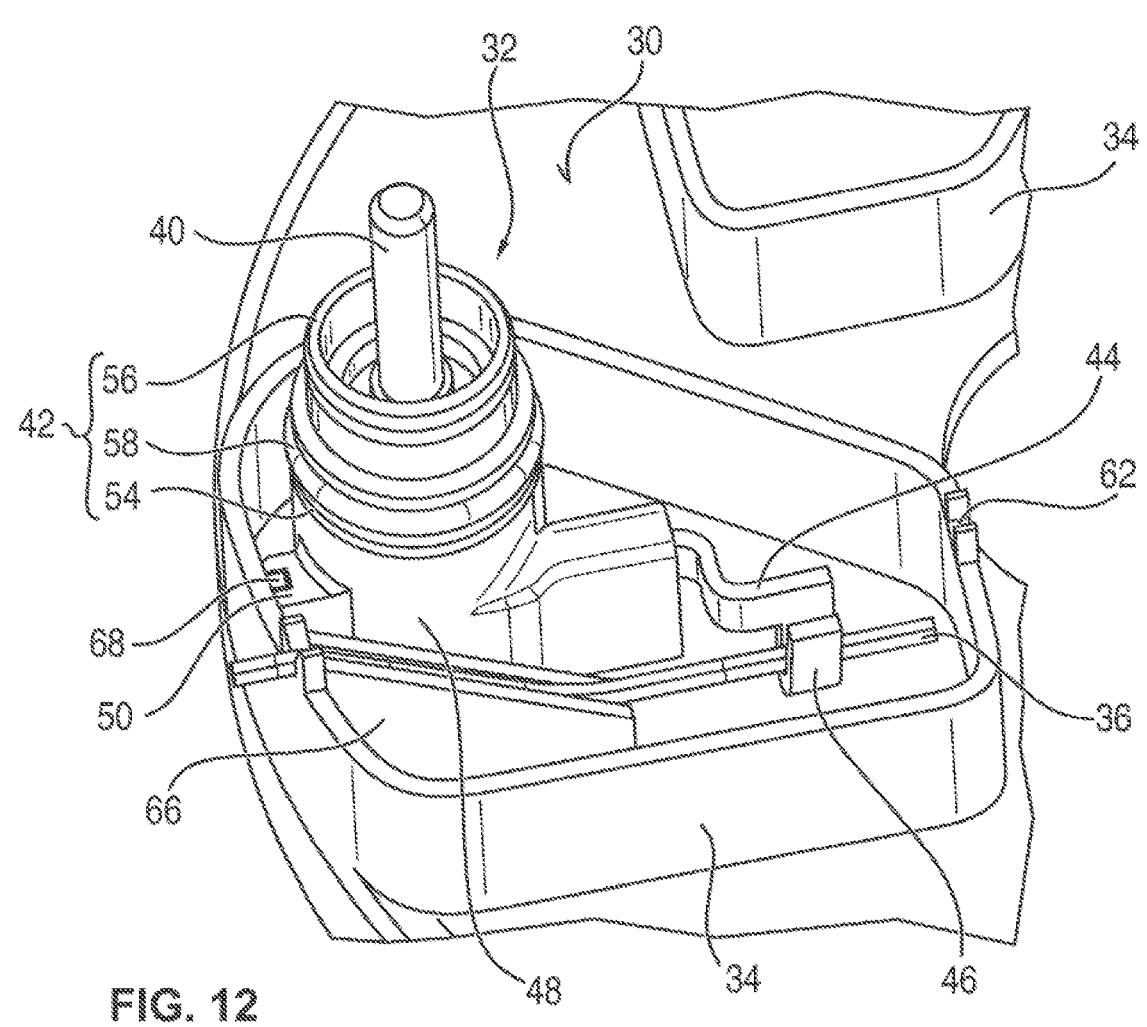

In order for the stator winding 28 to be connected, the phase connector 32 is first assembled in the potting pocket 34, for example. The wires, or the winding portions 36, of the stator winding are subsequently placed from the outside over the potting pockets 34 and onto the contact adapter 30 (FIG. 11). The winding portions 36 thus run so as to be axially co-aligned with the guide contours 62, 64, 66 and the contact region 46. As shown in FIG. 12, the winding portions 36 are subsequently pushed or pressed axially into the opening of the contact regions 46. Thereafter, the vertical U-legs of the contact region 46 are brought into electrically conductively contact the winding portion 36 by welding. Finally, the potting pocket 34 is filled with the potting material 38, and the potting material 38 is cured.

Figure 13:
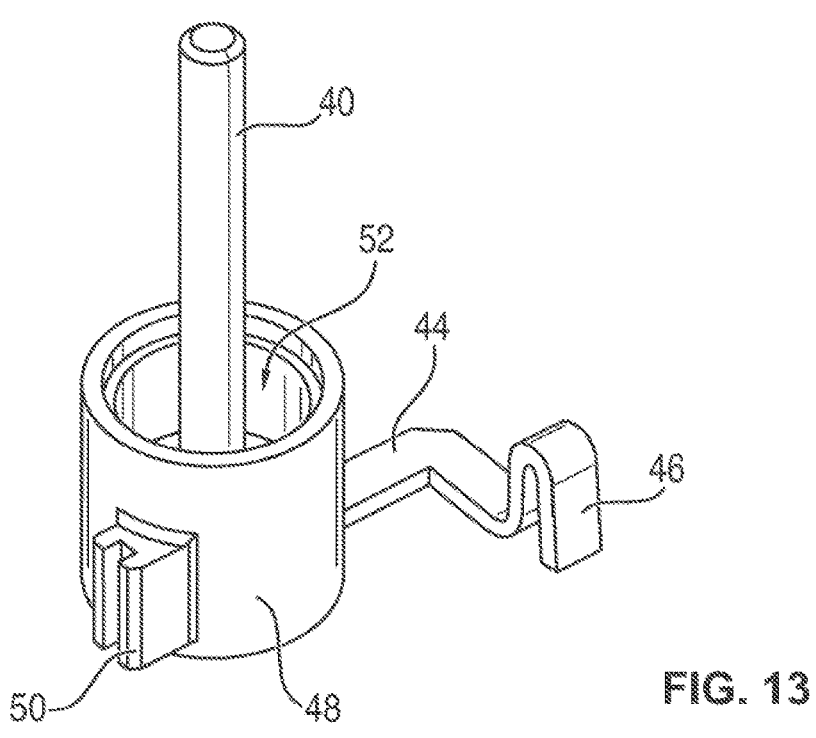
FIG. 13 is a perspective view of the phase connector in a second embodiment.

A second exemplary embodiment for the phase connector 32 is illustrated in FIG. 13, in which the through connection 42 is not shown. The exemplary embodiment of FIG. 13 differs substantially in terms of the structural embodiment of the conductor path 44. In this embodiment, the U-shape of the contact region 46 is open toward the bottom, thus toward the base of the potting pocket 34. Here, the winding portion 36 is first positioned in the potting pocket 34, and the phase connector 32, or the contact region 46, respectively, is subsequently inserted or attached from above.

The claimed invention is not limited to the exemplary embodiments described above. It is rather also possible for other variants of the invention to be derived therefrom within the scope of the disclosed claims by a person skilled in the art, without departing from the subject matter of the claimed invention. In particular, all individual features described in conjunction with the various exemplary embodiments may furthermore also be combined in some other way within the scope of the disclosed claims, without departing from the subject matter of the claimed invention.

The following is a summary list of reference numerals and the corresponding structure used in the above description of the invention.

LIST OF REFERENCE SIGNS

2 Refrigerant drive
4 Drive
6 Scroll compressor
8 Center plate
10 Drive housing
10*a* Motor housing
10*b* Electronics housing
12 Compressor housing
14 Flange connection
16 Housing cover
18 Electronics
20 Connector portion
22 Inlet
24 Outlet
26 Stator
28 Stator core
30 Contact adapter
32 Phase connector
34 Potting pocket
36 Winding portion
38 Potting material
40 Phase pin
42 Through connection
44 Conductor path
46 Contact region
48 Phase dome
50 Mating contour
52 Receptacle
54, 56 Sleeve
58 Sealing element
60 Depression/Positioning element
62 Guide contour/Wire-guiding groove
64, 66 Guide contour/Wire-guiding ramp
68 Positioning element
A Axial direction

The invention claimed is:

1. A stator for an electrical refrigerant drive, the stator comprising:

a stator core being wound with a stator winding having a winding portion;

at least one phase connector having a phase pin, a conductor path contacting said phase pin and being configured for contacting said winding portion, and a phase dome;

a contact adapter attached to said stator core for connecting said stator winding to said at least one phase connector;

said contact adapter having at least one potting pocket, said at least one potting pocket having integrally molded positioning elements for positioning and mounting the phase connector;

said at least one phase connector being inserted into said at least one potting pocket;

said winding portion of said stator winding being guided into said at least one potting pocket and contacting said at least one phase connector; and a cured potting material filling said at least one potting pocket;

said phase dome having mating contours for said positioning elements of said at least one potting pocket.

2. The stator according to claim 1, wherein said at least one potting pocket is formed by a projecting periphery being closed in an encircling manner and integrally molded on said contact adapter.

3. The stator according to claim 1, wherein said at least one potting pocket has an integrally molded guide contour for guiding said winding portion.

4. The stator according to claim 3, wherein said integrally molded guide contour of said at least one potting pocket is at least one of a wire-guiding groove or a wire-guiding ramp.

5. The stator according to claim 1, wherein said conductor path has a U-shaped contact region for contacting said winding portion.

6. The stator according to claim 1, wherein said phase dome is embodied as an overmolding of said phase pin and said conductor path.

7. An electrical refrigerant drive for a motor vehicle, the electrical refrigerant drive comprising a stator according to claim 1.

* * * * *